US012734503B2

(12) United States Patent
Lee et al.

(10) Patent No.: US 12,734,503 B2
(45) Date of Patent: Sep. 15, 2026

(54) PROCESS OF FORMING A GAS ADSORBANT MACROPOROUS MATERIAL

(71) Applicant: SPIRITUS TECHNOLOGIES, PBC, White Rock, NM (US)

(72) Inventors: Matthew Nicholson Lee, Los Alamos, NM (US); Jose Manuel Tafoya, Santa Fe, NM (US); Matthew Douglass Crall, White Rock, NM (US); Emily Webster Tew, White Rock, NM (US); Charles Frederick Cadieu, Burlingame, CA (US)

(73) Assignee: Spiritus Technologies, PBC, White Rock, NM (US)

( * ) Notice: Subject to any disclaimer, the term of this patent is extended or adjusted under 35 U.S.C. 154(b) by 862 days.

(21) Appl. No.: 17/974,377

(22) Filed: Oct. 26, 2022

(65) Prior Publication Data

US 2024/0139711 A1 May 2, 2024

(51) Int. Cl.
*B01J 20/26* (2006.01)
*B01D 53/02* (2006.01)
(Continued)

(52) U.S. Cl.
CPC ............ *B01J 20/262* (2013.01); *B01D 53/02* (2013.01); *B01J 20/103* (2013.01);
(Continued)

(58) Field of Classification Search
CPC .. B01J 20/262; B01J 20/103; B01J 20/28007; B01J 20/28019; B01J 20/3212;
(Continued)

(56) References Cited

U.S. PATENT DOCUMENTS

2006/0247362 A1* 11/2006 Shah ...................... B01J 20/328 524/494
2007/0022877 A1* 2/2007 Marand ................ B01J 31/1805 95/51

FOREIGN PATENT DOCUMENTS

CN 108367241 A * 8/2018 ............. B01J 35/45
JP 2004002160 A * 1/2004

OTHER PUBLICATIONS

Liu, Cai-Hong, “Fabrication and characterization of a toughened spherical chitosan adsorbent only through physical crosslinking based on mechanism of Chain Rearrangement”, RSC Advances, Issue 15 (Year: 2022).*

* cited by examiner

*Primary Examiner* — Anthony J Zimmer
*Assistant Examiner* — Jaanzeb C Raja
(74) *Attorney, Agent, or Firm* — CRGO Global; Steven M. Greenberg

(57) ABSTRACT

Compositing a gas adsorbant, macroporous object includes the immersion of a macroporous substrate into a charge stabilized suspension of nanoparticles that has been adapted for electrostatic repulsion. In this regard, the macroporous substrate includes a multiplicity of pores and demonstrates a compatibility with an adsorbant additive while lacking a repellant reaction to the charge stabilized solution. The nanoparticles are then positioned onto different walls of the pores resulting in the decoration of the macroporous structure with high surface volume materials. Finally, the macroporous substrate is removed from the suspension and dried. Thereafter, a gas adsorbant additive is introduced onto both surface portions of the macroporous substrate and also to the different walls of the pores of the macroporous substrate.

12 Claims, 2 Drawing Sheets

(51) Int. Cl.
*B01J 20/10* (2006.01)
*B01J 20/28* (2006.01)
*B01J 20/32* (2006.01)

(52) U.S. Cl.
CPC ... *B01J 20/28007* (2013.01); *B01J 20/28019* (2013.01); *B01J 20/3212* (2013.01); *B01J 20/3225* (2013.01); *B01J 20/3234* (2013.01); *B01J 20/3293* (2013.01); *B01D 2253/106* (2013.01); *B01D 2253/202* (2013.01); *B01D 2253/25* (2013.01); *B01D 2253/34* (2013.01)

(58) Field of Classification Search
CPC ................ B01J 20/3225; B01J 20/3234; B01J 20/3293; B01J 20/3204; B01D 53/02; B01D 2253/106; B01D 2253/202; B01D 2253/34
See application file for complete search history.

PROCESS OF FORMING A GAS ADSORBANT MACROPOROUS MATERIAL

BACKGROUND OF THE INVENTION

Field of the Invention

The present invention relates to the field of gas adsorption and more particularly to the fabrication of an object adapted as a substrate for adsorbed gaseous molecules.

Description of the Related Art

Adsorption refers to the increase in concentration of a substance at an interface of a condensed and a liquid or gaseous layer owing to the operation of surface forces. More concretely, adsorption is the adhesion of molecules of gas, liquid, or dissolved solids to a surface. The adsorption process results in the creation of a film of an adsorbate upon a surface of an adsorbent. Adsorption differs from absorption in which one substance permeates another. As well, whereas adsorption can be characterized as a surface phenomenon, absorption involves the whole volume of the material. Like surface tension, adsorption is a consequence of surface energy.

Adsorption capitalizes upon the tendency of one or more components of a liquid or gas to collect on the surface of a solid. This tendency can be leveraged to remove solutes from a liquid or gas or to separate components that have different affinities for the solid. The process objective may be either waste treatment or the purification of valuable components of a feed stream. In an adsorption process, the solid is called the adsorbent and the solute is known as the adsorbate.

In a bulk material, all the bonding requirements, whether ionic, covalent or metallic, of the constituent atoms of the bulk material are fulfilled by other atoms in the material. However, those atoms on the surface of the adsorbent are not wholly surrounded by other adsorbent atoms and therefore can attract adsorbates. The exact nature of the bonding depends on the details of the species involved, but the adsorption process is generally classified as physisorption characteristic of weak van der Waals forces, or chemisorption which is characteristic of covalent bonding. It is also understood by those of skill in the art, that adsorption also may occur owing to electrostatic attraction.

As to physisorption, the affinity of a fluid component for a particular adsorbent depends upon the molecular characteristics of the adsorbent such as the size, shape, and polarity of the surface of the adsorbent, the partial pressure or concentration in the fluid, and the system temperature. As noted, the attraction between adsorbent and adsorbate results from van der Waals forces as well as hydrophobic interactions—but not covalent bonding. Importantly, the bonding energies in the adsorption process are substantially lower than typical covalent bond energies thus allowing for low energy desorption. As such, the adsorption bonding energy is high enough for adsorption to occur, yet low enough to allow the adsorbent to be regenerated by removing the adsorbed molecules.

Essential to any large-scale adsorption and desorption process, then, is the characteristics of the adsorbent and the optimization of use of the surface area of the adsorbent in order to achieve a maximum volume of adsorbate bound to the surface of the adsorbent. To wit, the less efficient the adsorbent substrate is in respect to utilization of available surface area relative to the dimensions of the substrate, the more adsorbent material will be required in order to achieve a target volume of adsorbate fixed to the surface of the adsorbant. In a laboratory setting, so much is of little consequence. But in an industrial setting where millions of tons of adsorbate must be processed in a given year, the efficiency of adsorption demonstrated by an adsorption system is of paramount importance.

BRIEF SUMMARY OF THE INVENTION

Embodiments of the present invention address deficiencies of the art in respect to the creation of a gas adsorbant structure and provide a novel and non-obvious process for compositing a gas adsorbant, macroporous object so as to achieve optimization of utilization of the surface area of the object during a commercial adsorption operation. In an embodiment of the invention, a method of compositing a gas adsorbant, macroporous object includes immersing into a charge stabilized suspension of nanoparticles and adapted for electrostatic repulsion, a macroporous substrate that includes a multiplicity of pores and demonstrates a compatibility with an adsorbant additive and lacks a repellant reaction to the charge stabilized solution.

The method further includes the repelling of the nanoparticles onto the different walls of the pores so as to decorate the macroporous structure with high surface area materials, for example, through the introduction of a de-stabilizer to the solution, the de-stabilizer promoting swelling of the macroporous substrate and repelling the nanoparticles onto the different walls of the pores before drying the macroporous substrate, or as another example, through the freeze-drying of the macroporous structure while engorged with the suspension so as to vaporize the suspension liquid while leaving the nanoparticles to fall onto walls of the pores. Finally, the method includes introducing a gas adsorbant additive onto both surface portions of the macroporous substrate and also to the different walls of the pores of the macroporous substrate.

Various aspects of the embodiment include:

- The gas adsorbant additive is one of an amine monomer and an amine polymer.
- The gas adsorbent additive is covalently linked to the nanoparticles or to the silicone base or both.
- The nanoparticles include colloidal silica particles.
- The macroporous material has a silicone base.
- The additive destabilizer is a swelling solvent.
- The object has a spherical in shape.
- The drying is a freeze-drying or an evaporative drying.
- The suspension has a pH greater than 7.0.

In another embodiment of the invention, a method for enhancing gas adsorbant qualities of a gas adsorbant porous object includes repelling a multiplicity of nanoparticles, such as colloidal silica particles, onto the interior walls of the pores of a gas adsorbant object, preferably a spherically shaped object. The repulsion of the nanoparticles leading to assembly onto the walls of the pores can be achieved, for instance through a precipitation of the nanoparticles from a charge stabilized suspension of the nanoparticles, or an electrostatic repulsion of the nanoparticles from the charge stabilized suspension that positions the nanoparticles in sufficient contact with the walls of the pores so as to enable binding through van der Waals forces or chemical bonding mechanisms. Subsequently, a gas adsorbant solution can be added to the walls of the gas adsorbant object, such as an amine monomer solution or an amine polymer solution, so as to have created a gas adsorbant porous object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the composition of a gas adsorbant, macroporous object useful in adsorbing a gas adsorbant in a large-scale physisorption system. In accordance with an embodiment of the invention a macroporous object, such as a silicone sphere, which defines multiple different pores, can be pre-treated with an electrostatically neutral suspension of nanoparticles, such as silica. During pre-treatment, the nanoparticles are repelled onto the walls of each of the pores so as to enhance the surface area of the pores. In this regard, the nanoparticles may be repelled onto the walls of each of the pores by introducing an electrically charged destabilizer into the pores of the object, or by freeze drying the suspension leaving the nanoparticles to fall out onto the walls of the pores. Finally, a gas adsorbant additive such as an amine monomer or an amine polymer, fixes to the surface of the object including the nanoparticles of the pores in order to create a highly optimized gas adsorbant macroporous object suitable for use in a large-scale commercial gas adsorption system. In this regard, the fixing to the surface can include a chemical bonding of the additive to the surface, a physical impregnation of the surface with the additive, a grafting of the additive to the surface, or a chemical linking of the additive to the surface.

Figure 1:
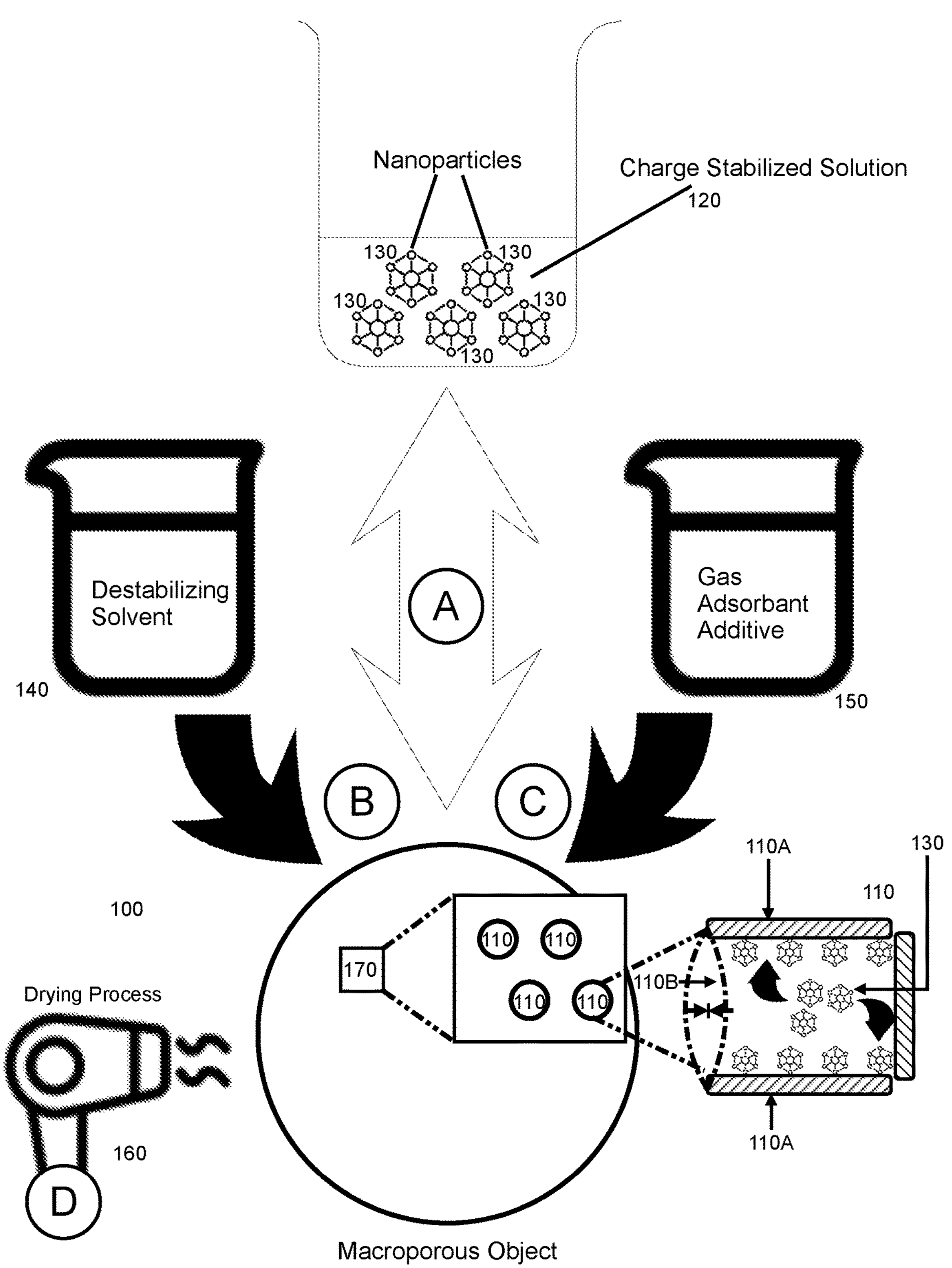
FIG. 1 is a pictorial illustration of a process for compositing a gas adsorbant, macroporous object.

In further illustration, FIG. 1 pictorially shows an exemplary albeit non-limiting process for compositing a gas adsorbant, macroporous object. As shown in FIG. 1, a macroporous object 100 includes a surface 170 with a set of micrometer scale pores 110. As shown in the cut-away, detailed portion of FIG. 1, each of the pores 110 can be defined by pore walls 110A and a pore opening 110B. In a first step (A), a charge suspension of nanoparticles 130 in a charge stabilized suspension 120 can be introduced to the macroporous object 100, for example by immersing the macroporous object 100 into a container of the charge stabilized suspension 120. In doing so, the suspension 120 invades each interior portion of the pores 110 including the nanoparticles 130 suspended therein.

Subsequently, in step (B) a destabilizer 140 is added to the macroporous object 100 causing a repulsion of the nanoparticles 130 onto the walls 110A of the pores 110A. The repulsion shown in the cut-away detailed portion of FIG. 1 can be characterized as a precipitation of the nanoparticles 130 from the suspension 120 onto the pore walls 110A. As an alternative to the addition of the destabilizer, the macroporous object 100 can be subjected to freeze-drying so as to separate the nanoparticles 130 from surrounding solution in the suspension 120 so as to cause the nanoparticles 130 to fix to the pore walls 110A. Thereafter, in step (C) the macroporous object 100, now decorated with the nanoparticles 130—particularly with respect to the pore walls 110A, is exposed to a gas adsorbant additive 150. Finally, in step (D) the macroporous object 100, is removed from the presence of the additive 150 and subjected to a drying process 160.

Figure 2:
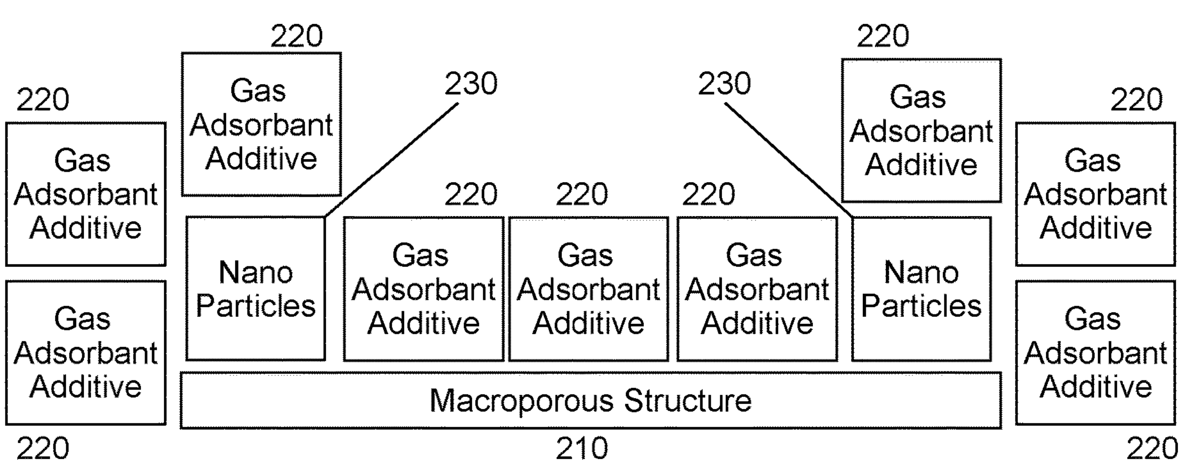
FIG. 2 is a schematic illustration of a macroporous structure decorated with nanoparticles and a gas adsorbant additive as a result of the compositing process of FIG. 1; and, FIG. 3 is a flow chart illustrating a process for compositing a gas adsorbant, macroporous object.

In further illustration of the structure of the composition created in the process of FIG. 1, FIG. 2 is a schematic illustration of a macroporous structure decorated with nanoparticles and a gas adsorbant additive. As shown in FIG. 2, a macroporous structure 210 is decorated with nanoparticles 230 in order to enhance a surface area of the structure 210 onto which a gas adsorbant additive 220 is affixed. Consequently, the total surface area of the macroporous structure 210 is enlarged to accommodate a greater volume of adsorbed gaseous molecules so as to optimize an adsorption capacity of the. macroporous structure 210.

Figure 3:
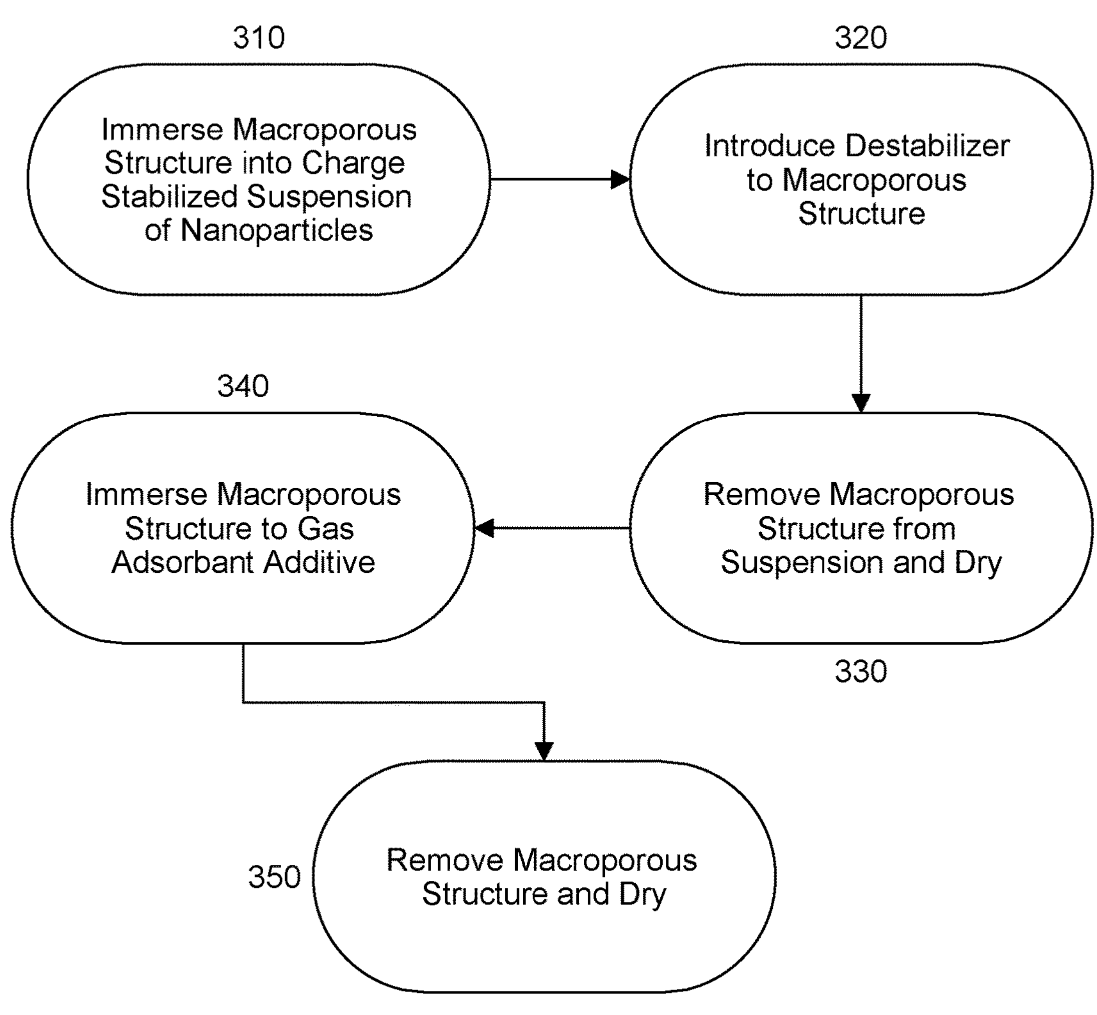

In even yet further illustration of the process of FIG. 1 producing the object of FIG. 2, FIG. 3 is a flow chart illustrating a process for compositing a gas adsorbant, macroporous object. Beginning in block 310, a macroporous structure of a silicone base is immersed into a charge stabilized suspension adapted for electrostatic repulsion and including nanoparticles, for instance, colloidal silica particles. The macroporous structure necessarily must lack a repellant reaction to the charge stabilized solution. As well, preferably, the charged stabilized suspension has a pH greater than 7.0.

In block 320, a destablizer is added to the macroporous structure and can include, a swelling solvent, so as to cause swelling of the macroporous structure, while repelling the nanoparticles onto to different walls of the pores resulting in the decoration of the macroporous structure with high surface volume material. Thereafter, in block 330 the macroporous structure is removed from the presence of the suspension and allowed to dry. Then, in block 340 the macroporous structure is immersed into an adsorbant additive. In this regard, the adsorbant additive can include an amine monomer or an amine polymer. Finally, in block 350, the macroporous structure is removed from the presence of the adsorbant additive and dried, for instance by operation of freeze-drying. The result is a gas adsorbant, macroporous object optimized for physisorption in a large-scale adsorption system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of compositing a gas adsorbant, macroporous object comprising:

immersing into a charge stabilized suspension of nanoparticles and adapted for electrostatic repulsion, an adsorbent additive compatible macroporous substrate comprising a multiplicity of pores lacking a repellant reaction to the charge stabilized suspension;

swelling the macroporous substrate and repelling the nanoparticles onto different walls of the multiplicity of the pores by introducing a de-stabilizer to the charge stabilized suspension;

removing the macroporous substrate from the suspension;

drying the macroporous substrate; and introducing a gas adsorbant additive onto surface portions of the macroporous substrate and also to the different walls of the pores of the macroporous substrate wherein the macroporous material comprises a silicone base.

2. The method of claim 1, wherein the positioning includes freeze-drying the macroporous structure including the suspension causing a vaporization of the suspension leaving only the nanoparticles to fix to the different walls of the pores.

3. The method of claim 1, wherein the gas adsorbant additive is one of an amine monomer and an amine polymer.

4. The method of claim 1, wherein the nanoparticles comprise colloidal silica particles.

5. The method of claim 1, wherein the destabilizer is a swelling solvent.

6. The method of claim 1, wherein the object is spherical in shape.

7. The method of claim 1, wherein the drying is a freeze-drying.

8. The method of claim 1, wherein the suspension has a pH greater than 7.0.

9. A method for enhancing gas adsorbant qualities of a gas adsorbant porous object comprising:

moving a multiplicity of nanoparticles out of a charge stabilized suspension of the multiplicity of the nanoparticles onto interior walls of pores of a gas adsorbant object by swelling a macroporous substrate of the gas adsorbant object and repelling the nanoparticles onto the interior walls by introducing a de-stabilizer to the charge stabilized suspension; and, subsequently adding to the walls of the gas adsorbant object, a gas adsorbant solution wherein the macroporous material comprises a silicone base.

10. The method of claim 9, wherein the nanoparticles comprise colloidal silica particles.

11. The method of claim 9, wherein the gas adsorbant solution is one of an amine monomer solution and an amine polymer solution.

12. The method of claim 9, wherein the object is spherical in shape.

* * * * *